US012591488B2

(12) United States Patent
    Kang

(10) Patent No.: US 12,591,488 B2
(45) Date of Patent: Mar. 31, 2026

(54) CONTROLLER AND STORAGE DEVICE

(71) Applicant: SK hynix Inc., Icheon-si (KR)

(72) Inventor: Hye Mi Kang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/913,399

(22) Filed: Oct. 11, 2024

(65) Prior Publication Data

US 2025/0377978 A1 Dec. 11, 2025

(30) Foreign Application Priority Data

Jun. 10, 2024 (KR) ......................... 10-2024-0074685

(51) Int. Cl.
   *G06F 12/00* (2006.01)
   *G06F 11/1446* (2026.01)
(52) U.S. Cl.
   CPC ............................... *G06F 11/1448* (2013.01)
(58) Field of Classification Search
   CPC ..... G06F 11/1448; G06F 3/065; G06F 12/023
   See application file for complete search history.

(56) References Cited

U.S. PATENT DOCUMENTS

2023/0342078 A1* 10/2023 Thomas ................ G06F 3/0659

FOREIGN PATENT DOCUMENTS

KR 20180000606 A 1/2018

* cited by examiner

*Primary Examiner* — Shawn X Gu
(74) *Attorney, Agent, or Firm* — Perkins Coie LLP

(57) ABSTRACT

A storage device is provided to include: a memory including a plurality of storage blocks, each storage block including pages including a valid page to which valid data is written and a snapshot page that stores data corresponding to or associated with data in the valid page; and a controller in communication with the memory and configured to i) generate a valid segment including valid address data indicating an address of the valid page and valid map information indicating a storage location of the valid segment, ii) manage the valid page based on the valid segment and the valid map information, iii) generate a snapshot segment including snapshot address data indicating an address of the snapshot page and snapshot map information indicating a storage location of the snapshot segment, and iv) manage the snapshot page based on the snapshot segment and the snapshot map information.

20 Claims, 10 Drawing Sheets

CONTROLLER AND STORAGE DEVICE

CROSS-REFERENCE TO RELATED APPLICATION

This patent document claims the priority and benefits of Korean Patent Application No. 10-2024-0074685 filed in the Korean Intellectual Property Office on Jun. 10, 2024, which is incorporated herein by reference in its entirety.

TECHNICAL FIELD

Various embodiments of the present disclosure generally relate to a controller and a storage device.

BACKGROUND

A storage device may include at least one memory which stores data. The storage device may include a controller which controls the operation of the at least one memory.

For example, the controller may control an operation of writing data to the memory. The controller may control an operation of reading data written to the memory. The controller may control the operation of the memory on the basis of a command received from an external device or an internally generated command.

An abnormality may occur during the operation of the storage device, and power supplied to the storage device may be suddenly cut off. In this case, loss of data stored in the storage device may occur.

SUMMARY

Embodiments of the present disclosure are directed to providing measures capable of efficiently recovering data stored in a storage device to a normal time point designated by a host device when an abnormality occurs during the operation of the storage device or the host device.

In an embodiment, a storage device may include: a memory including a plurality of storage blocks, each of the plurality of storage blocks including pages configured to store data, wherein the pages included in each of the plurality of storage blocks include a valid page to which valid data is written and a snapshot page that stores data corresponding to or associated with data in the valid page; and a controller in communication with the memory to access information in the memory on the valid page and the snapshot page and configured to i) generate a valid segment including valid address data indicating an address of the valid page and valid map information indicating a storage location of the valid segment, ii) manage the valid page based on the valid segment and the valid map information, iii) generate a snapshot segment including snapshot address data indicating an address of the snapshot page and snapshot map information indicating a storage location of the snapshot segment, and iv) manage the snapshot page based on the snapshot segment and the snapshot map information.

In an embodiment, a storage device may include: a memory configured to store data including a plurality of storage blocks, wherein at least one of the plurality of storage blocks stores N (N is an integer where N≥1) pages and the N pages include a valid page to which valid data is written and a snapshot page including information corresponding to the valid data; and a controller in communication with the memory and configured to i) generate a valid segment including valid address data indicating an address of the valid page and valid map information indicating a storage location of the valid segment, ii) manage the valid page using the valid segment and the valid map information, iii) generate a snapshot segment including snapshot address data indicating an address of the snapshot page and snapshot map information indicating a storage location of the snapshot segment, and iv) manage the snapshot page based on the snapshot segment and the snapshot map information, wherein at least one snapshot page is same as at least one valid page.

In an embodiment, a controller may include: a buffer memory; and a snapshot controller configured to i) load, into the buffer memory, a valid mapping table indicating a storage location of a valid page stored in an external memory and a valid count table indicating the number of valid pages, ii) generate, in response to performing a snapshot operation, a snapshot mapping table indicating a storage location of a snapshot page by copying the valid mapping table, and iii) generate a snapshot count table indicating the number of snapshot pages by copying the valid count table.

According to the embodiments of the present disclosure, it is possible to provide measures capable of facilitating recovery of data stored in a storage device when an abnormality occurs in the storage device, improving the operation efficiency of the storage device and minimizing decrease in data storage efficiency of the storage device.

BRIEF DESCRIPTION OF THE DRAWINGS

FIG. 1 is a diagram illustrating an example of the schematic configuration of a storage device according to an embodiment of the present disclosure.

FIG. 3 is a diagram illustrating an example of a method in which a valid page and a snapshot page are managed in the storage device according to the embodiment of the present disclosure.

FIG. 4 is a diagram illustrating an example of a method in which an operation according to a command is performed in a state in which a valid page and a snapshot page are stored in the storage device according to the embodiment of the present disclosure.

FIG. 6 is a diagram illustrating an example of a specific method in which a valid page and a snapshot page are managed in the storage device according to the embodiment of the present disclosure.

DETAILED DESCRIPTION

Figure 2:
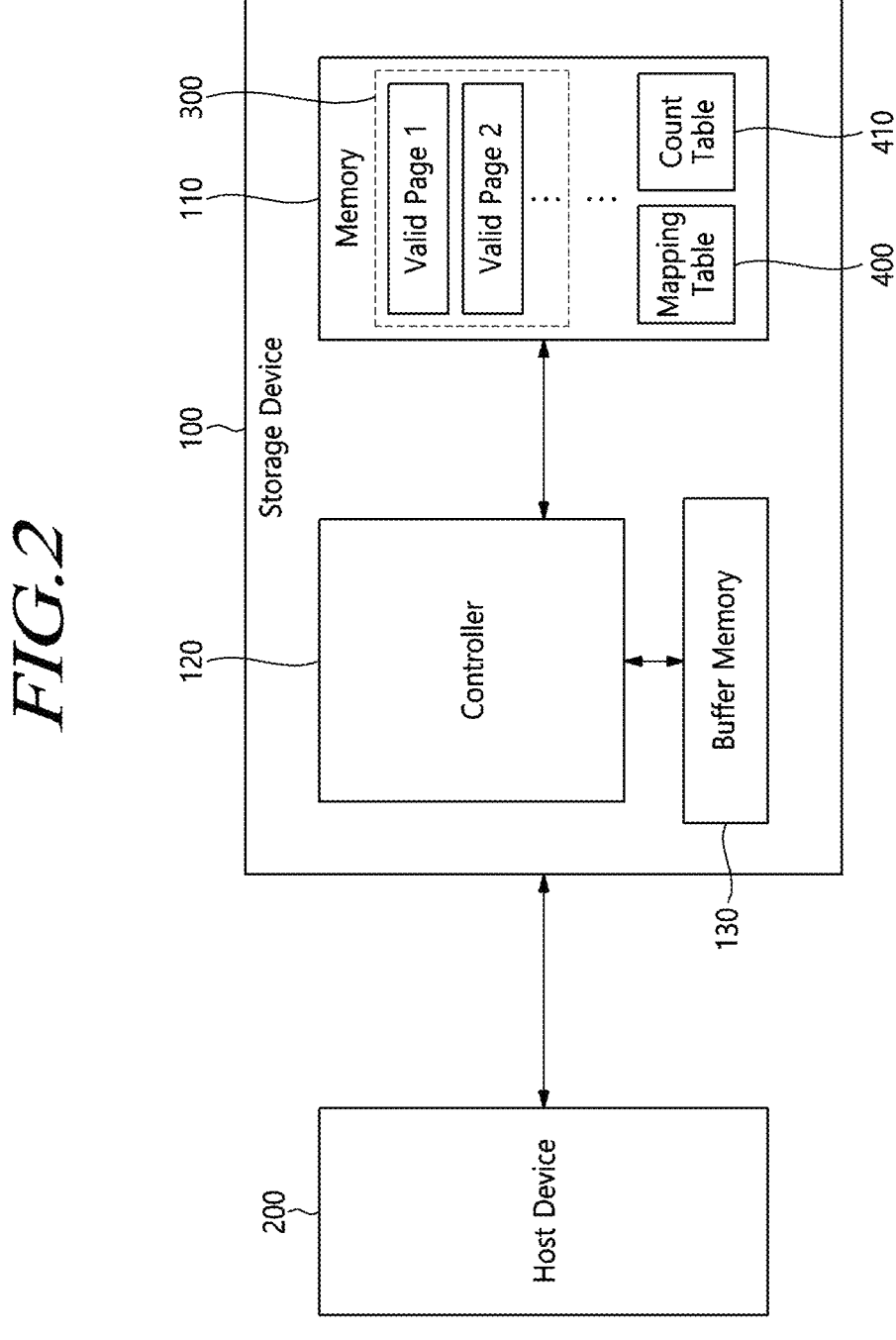
FIG. 2 is a diagram illustrating an example of a method in which a valid page is stored and managed in the storage device according to the embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another.

Various examples of embodiments of the present disclosure are described below with reference to accompanying drawings.

Figure 1:
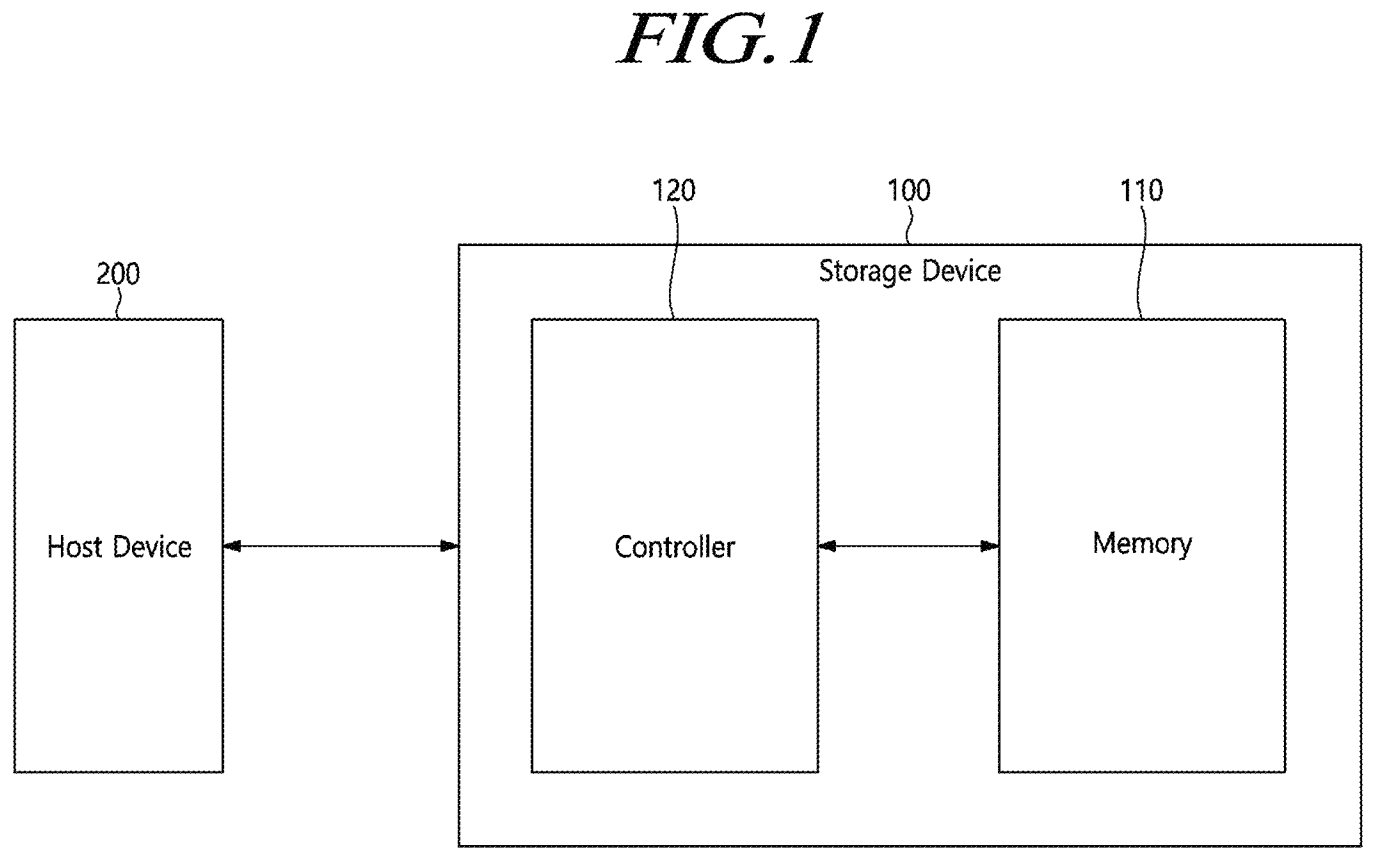

FIG. 1 is a diagram illustrating an example of the schematic configuration of a storage device 100 according to an embodiment of the present disclosure.

Referring to FIG. 1, the storage device 100 according to the embodiment of the present disclosure may include at least one memory 110. The storage device 100 may include a controller 120 which controls the operation of the memory 110.

The memory 110 may be, for example, volatile memory such as DRAM (dynamic random access memory), SDRAM (synchronous DRAM), DDR SDRAM (double data rate SDRAM) and LPDDR SDRAM (low-Power double data rate SDRAM), but the embodiment of the present disclosure is not limited thereto. The memory 110 may be nonvolatile memory such as NAND flash memory, 3D NAND flash memory and NOR flash memory. In some implementations, one part of the memory 110 included in the storage device 100 may be volatile memory, and the other part may be nonvolatile memory.

The memory 110 may include various types of memories such as resistive RAM, phase change memory, magnetoresistive memory, ferroelectric memory and spin transfer torque memory. In some implementations, the memory 110 may be processing-in-memory which includes a calculation function or a data processing function.

The memory 110 may include a plurality of storage blocks. Each of the plurality of storage blocks may include a plurality of memory cells configured to store data.

The controller 120 may receive a command from the outside, and may control the operation of the memory 110 on the basis of the received command. The controller 120 may control the operation of the memory 110 on the basis of an internally generated command. In the present specification, a command which the controller 120 receives from the outside may be referred to as an external command, and a command which is generated inside the controller 120 may be referred to as an internal command.

The controller 120 may control the operation of the memory 110 based on an external command or an internal command. For example, the controller 120 may control an operation of writing data to the memory 110. The controller 120 may control an operation of reading data written to the memory 110. Data may be transmitted and received between the controller 120 and the memory 110.

Depending on the type of the memory 110, the controller 120 may control a data preservation operation (e.g., a refresh operation or a patrol scrub operation) or an erase operation on data written to the memory 110.

The controller 120 may control the operation of the memory 110 on the basis of a command received from an external host device 200. The controller 120 may provide the host device 200 with a processing result according to an operation corresponding to the command. The controller 120 may transmit data or a response signal to the host device 200.

For example, the host device 200 may include or be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, an RFID (radio frequency identification) device, a mobility device (e.g., a vehicle, a robot or a drone) capable of traveling under human control or autonomous driving, or others. In some implementations, the host device 200 may include or be a virtual/augmented reality device which provides a 2D or 3D virtual reality image or augmented reality image. In some implementations, the host device 200 may include or be any one of various electronic devices each of which requires the storage device 100 capable of storing data.

The host device 200 may include at least one operating system. The operating system may manage and control overall functions and operations of the host device 200, and may control interoperations between the host device 200 and the storage device 100. The operating system may be classified into a general operating system and a mobile operating system depending on the mobility of the host device 200.

The controller 120 and the host device 200 may include or be devices which are separated from each other. In some implementations, the controller 120 and the host device 200 may be implemented by being integrated as one device, or some components or functions of the controller 120 may be implemented by being included in the host device 200. Hereunder, for the sake of convenience in explanation, it will be described as an example that the controller 120 and the host device 200 are devices which are separated from each other.

In order to maintain and improve the operation performance of the storage device 100, the controller 120 may perform a background operation associated with the memory 110 on the basis of an external command received from the host device 200 or on the basis of an internal command. A background operation may refer to an operation performed within the memory 110 without an intervention of the host device 200 by sending a command to the memory 110 from the host device 200 and without receiving and executing one or more commands from the host device 200. Some examples of the background operation may include, for example, at least one among garbage collection, wear leveling, read reclaim and bad block management operations. Based on control of the background operation, the controller 120 may improve the operation performance of the storage device 100 or prevent the operation performance from deteriorating.

The controller 120 may write data to the memory 110 and manage the data, based on a command received from the host device 200. The controller 120 may store and manage meta information for managing the data written to the memory 110. While the data written to the memory 110 includes valid data and invalid data, the controller 120 may separately manage the valid data from the invalid data.

FIG. 2 is a diagram illustrating an example of a method in which a valid page is stored and managed in the storage device 100 according to the embodiment of the present disclosure.

Referring to FIG. 2, the memory 110 of the storage device 100 may include a plurality of storage blocks 300. Each of the plurality of storage blocks 300 may have a predetermined size. The controller 120 may store and manage data by the unit of storage block 300. In some implementations, the controller 120 may set and manage the size of the storage block 300 according to a request from the host device 200.

The storage block 300 may include a plurality of memory cells. Each of the plurality of memory cells may store, for example, 1 bit data. In some implementations, each of the plurality of memory cells may store 2 or 3 bit data, but is not limited thereto.

Two or more memory cells may constitute one page. The storage block 300 may include a plurality of pages.

The controller 120 may write data to a page of the storage block 300 according to a command from the host device 200. The page to which data is being written may be managed as a valid page. For example, when the data A is being written to the page A, the page A is managed as the valid page. After the data A is written to the page A, if the controller 120 receives a request to overwrite or update the data A to the data B from the host device 200, data B may be written to page A and data A previously written to the page A may be written to another page, page B. In this case, the controller 120 may manage the page A, to which data is overwritten or updated, as a valid page, and may manage the page B, to which the data A is written, as an invalid page.

The controller 120 may generate, store and manage various tables to write and manage data according to a command from the host device 200.

For example, the controller 120 may manage a valid mapping table 400 which includes information on a physical region to which data is written.

For example, the valid mapping table 400 may include information on the mapping relationship between the logical address of data according to a request from the host device 200 and the physical address of a region to which the data is written in the memory 110. The valid mapping table 400 may be provided in the form of a single table, or may be provided in a form in which at least two tables are combined.

The controller 120 may manage a valid count table 410 which includes information on the number of valid pages among pages included in each storage block 300.

For example, the valid count table 410 may provide information on the index of each storage block 300 and the number of valid pages included in each storage block 300. The number of valid pages provided by the valid count table 410 may be used in an operation for efficiently managing the storage block 300.

The controller 120 may store and manage the valid mapping table 400 and the valid count table 410 in a region other than a region where data is stored in the memory 110. In an operation, the controller 120 may load and use the valid mapping table 400 and the valid count table 410 written to the memory 110, in a buffer memory 130 included in the storage device 100.

The buffer memory 130 may include or be, for example, volatile memory such as SRAM or DRAM. The buffer memory 130 may be located outside the controller 120 or may be located inside the controller 120. The controller 120 may load the valid mapping table 400 and the valid count table 410 in the buffer memory 130, and may use the valid mapping table 400 and the valid count table 410 to write data to the storage block 300 of the memory 110 or read data written to the storage block 300. In some implementations, the controller 120 may store data, which is requested by the host device to write, to the buffer memory 130, and then, write the data by copying the data to the memory 110.

When an abnormal operation or a sudden power-off occurs in the storage device 100, the controller 120 may perform a snapshot operation for recovering data written to the storage block 300 of the memory 110. The snapshot operation may be an operation to preserve a data stored in the storage device 100 in a certain time. The preserved data may be used to recover the data stored in the storage device 100 in the certain time later. A snapshot data may be generated by the snapshot operation, and a type of the snapshot data may be various.

Figure 3:
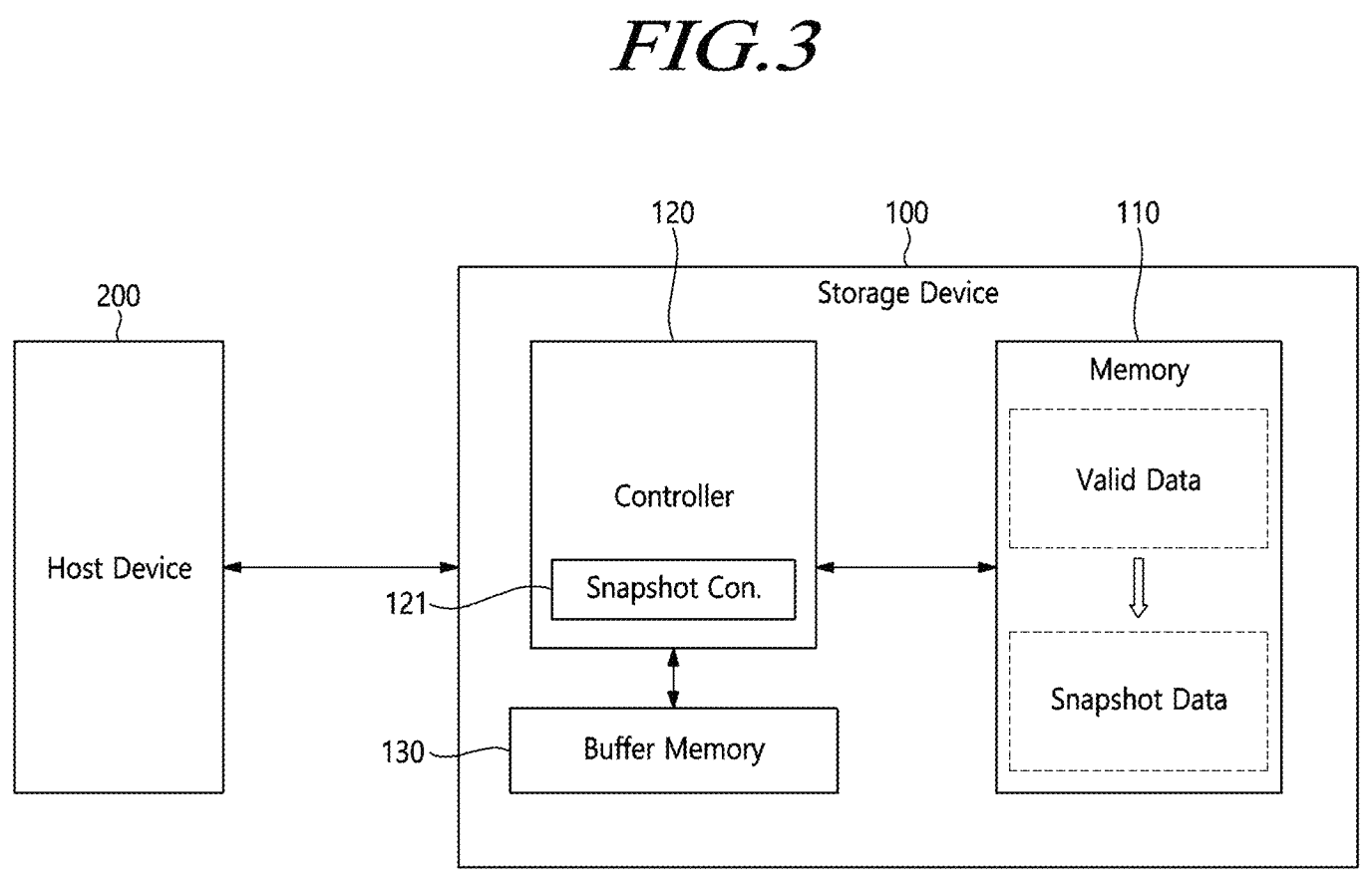

FIG. 3 is a diagram illustrating an example of a method in which a valid page and a snapshot page are managed in the storage device 100 according to the embodiment of the present disclosure.

Referring to FIG. 3, the controller 120 may include a snapshot controller 121.

The snapshot controller 121 may perform a snapshot operation at a preset time point.

In some implementations, the preset time point may mean, for example, a time point when a predetermined time elapses after the storage device 100 is turned on. In some implementations, the preset time point may mean a time point when the total operation time of the storage device 100 satisfies a certain condition, e.g., the total operation time of the storage device 100 becomes a predetermined time. In some implementations, the preset time point may mean a time point when the size of data stored in the memory 110 of the storage device 100 is equal to or larger than a predetermined size. In some implementations, the preset time point may refer to a time point when a snapshot request is received from the host device 200 or a time point that is designated according to a snapshot request received from the host device 200. The snapshot operation may be performed by a control initiated by the controller 120, and also, the snapshot operation may be performed by the snapshot request transmitted by the host device 200. The host device 200 may request for the storage device 100 to generate and manage the snapshot data which is used for preserving a data stored in the storage device 100 in a certain time and recovering the data later.

The preset time point is not limited to the examples described above. The snapshot controller 121 may perform a snapshot operation at each preset time point to manage data stored in the memory 110.

The snapshot controller 121 may generate snapshot data by performing the snapshot operation. In some implementations, the snapshot data may include data generated by copying valid data stored in the memory 110. In some implementations, the snapshot data may include more data as discussed below.

For example, the snapshot data may be included in a snapshot page corresponding to a valid page included in a storage block 300. The snapshot page may be a copy of the valid page when the snapshot operation is performed. The snapshot data may include a table corresponding to the valid mapping table 400 which indicates the physical address of the valid page written to the storage block 300. The table corresponding to the valid mapping table 400 may be a copy of at least a part of the valid mapping table 400. The snapshot data may include a table corresponding to the valid count table 410 which includes information on the number of valid pages written to the storage block 300. The table corresponding to the valid count table 410 may be a copy of at least a part of the valid count table 410.

The snapshot data is not limited to the example described above, and may include valid data stored in the memory 110 and data required to manage the valid data. In some implementations, the snapshot data may include only a part of the above-described data.

The snapshot controller 121 may generate the snapshot data by performing the snapshot operation at the preset time point, and may store and manage the snapshot data in the memory 110. In the state in which the snapshot data is stored by the snapshot controller 121, the controller 120 may control the operation of the memory 110 on the basis of an external command or an internal command.

When controlling the operation of the memory 110 by the controller 120, the snapshot data stored in the memory 110 may be managed. Management of the snapshot data after generation of the snapshot data may be performed by the snapshot controller 121, or may be performed by a component in the controller 120, which controls an operation according to an external command or an internal command.

Figure 4:
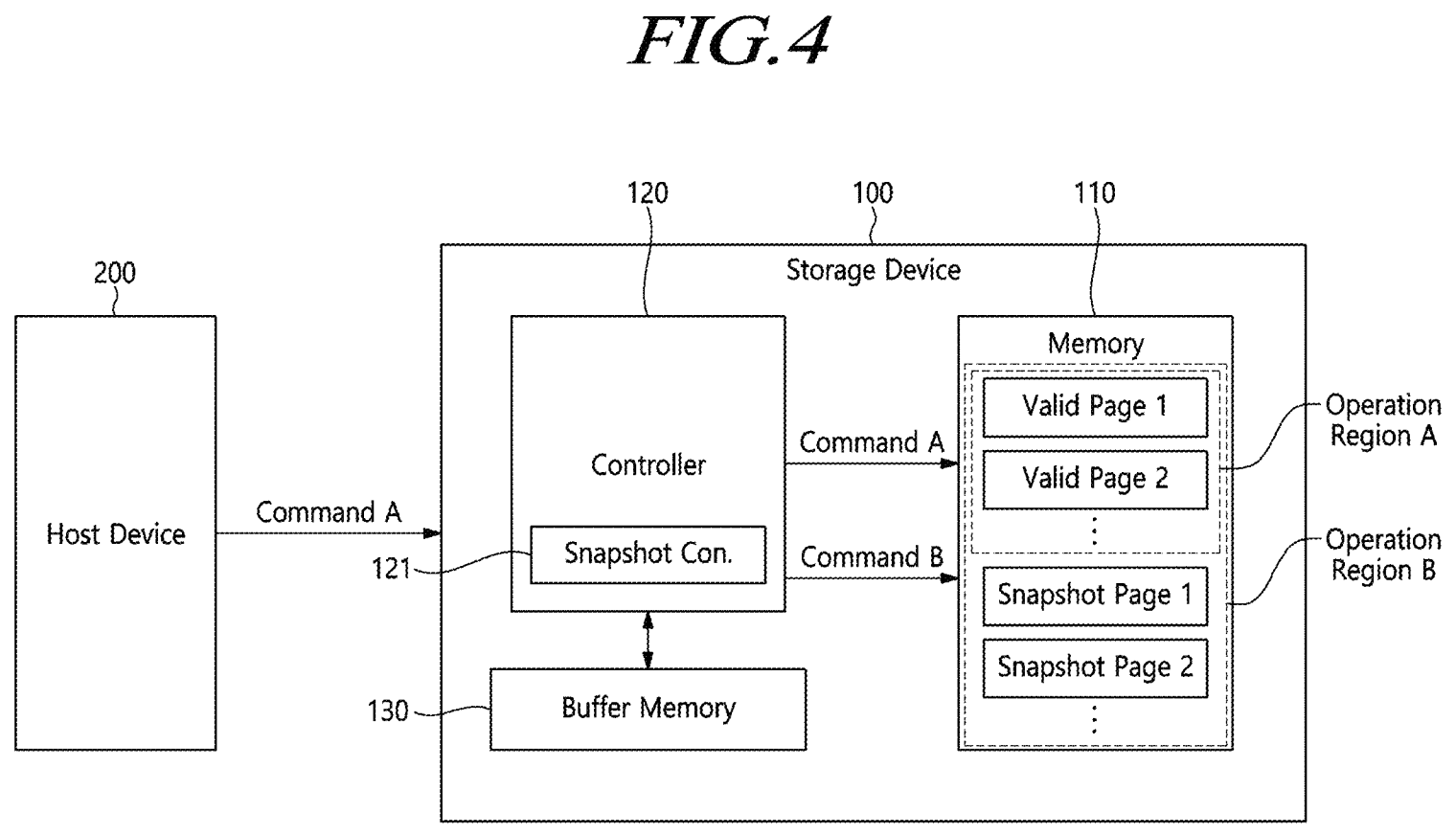

FIG. 4 is a diagram illustrating an example of a method in which an operation according to a command is performed in a state in which a valid page and a snapshot page are stored in the storage device 100 according to the embodiment of the present disclosure.

Referring to FIG. 4, a state in which a snapshot operation is performed by the snapshot controller 121 is illustrated as an example. A plurality of valid pages such as a first valid page and a second valid page may be stored in the memory 110.

As the snapshot operation is performed by the snapshot controller 121, a first snapshot page and a second snapshot page corresponding to the first valid page and the second valid page, respectively, may be generated. A snapshot page may store data corresponding to the data of a valid page, or may store data necessary to recover the data of a valid page. For example, the snapshot page (Snapshot Page 1) may store data corresponding to the data of the corresponding valid page (Valid Page 1) or data necessary to recover the data of the corresponding valid page (Valid Page 1). For example, the snapshot page (Snapshot Page 2) may store data corresponding to the data of the corresponding valid page (Valid Page 2) or data necessary to recover the data of the corresponding valid page (Valid Page 2).

In a state in which snapshot data is stored and managed in the memory 110, the controller 120 may control an operation according to a command received from the host device 200.

The controller 120 may control the operation of the memory 110 according to a command A received from the host device 200. According to the command A, the controller 120 may control an operation of writing data to the memory 110 or reading data written to the memory 110.

When controlling an operation according to the command A of the host device 200, the controller 120 may control an operation on a region where a valid page is written in the memory 110 (see Operation Region A in FIG. 4).

The controller 120 may not perform an operation on a region where the snapshot data is stored (see Operation Region B in FIG. 4). Since the snapshot data is data managed for recovery of data of a specific time point when an abnormality occurs in the operation of the storage device 100, the snapshot data may be maintained while not being changed when controlling the operation according to the command A received from the host device 200 after the snapshot operation. For example, the snapshot data may be a copy of a data stored in the storage device 100 in a certain time. While the data stored in the storage device 100 may be changed according to the time is passed, but the snapshot data may be maintained before a next snapshot operation is performed. Thus, the snapshot data may be used to recover the data stored in the storage device 100 in the certain time later. In some cases, the snapshot data may be deleted by a control of the controller 120. For example, the controller 120 may delete at least a part of the snapshot data for reserving a storage region.

The controller 120 may control the operation of the memory 110 based on an internally generated command B, which is different from the command A received from the host device 200.

The command B of the controller 120 may include or be, for example, a command which instructs a background operation such as a garbage collection or read reclaim operation. The controller 120 may perform a background operation to efficiently manage a storage region of the memory 110 and prevent an error from occurring depending on the number of times the storage region is used.

When performing a background operation by the controller 120, the background operation may be performed on a region where a valid page is written (see Operation Region A in FIG. 4) and a region where a snapshot page is written (see Operation Region B in FIG. 4). Since the background operation is an operation for efficient management of a storage region of the memory 110, the background operation may be performed also on a region where a snapshot page is stored (see Operation Region B in FIG. 4).

In some implementations, when performing an operation according to a command other than a write command or a read command received from the host device 200, the controller 120 may perform control on regions including a region where a snapshot page is stored. For example, according to a request from the host device 200, the controller 120 may control on an operation similar to garbage collection may be performed. In this case, the control may be performed on a region where a valid page is stored and a region where a snapshot page is stored.

When performing a background operation, the controller 120 may control an operation on a snapshot page corresponding to a valid page. This operation may include an operation of copying the snapshot page to another region.

When performing the background operation, the controller 120 may perform control even on tables which correspond to the valid mapping table 400 and the valid count table 410, respectively. Those tables are generated based on the snapshot operation and help the management of a valid page. For example, upon copying of the snapshot page, the controller 120 may update information of the tables for management of the snapshot page.

As a snapshot page corresponding to a valid page and tables corresponding to the valid mapping table 400 and the valid count table 410 for management of the valid page are managed by the controller 120, recovery based on snapshot data may be easily performed when an abnormality occurs in the storage device 100.

The valid mapping table 400 and the valid count table 410 for management of a valid page may be implemented in various forms. For example, the valid mapping table 400 may include at least two tables, and a snapshot operation according to the embodiment of the present disclosure may be applied to various forms of the valid mapping table 400 and the valid count table 410.

Figure 5:
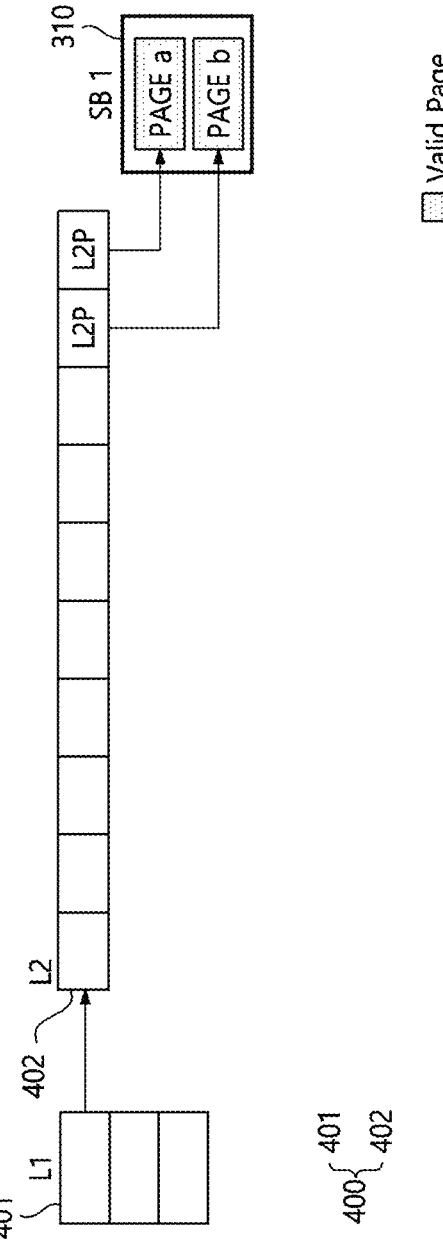
FIG. 5 is a diagram illustrating an example of a specific method in which a valid page is managed in the storage device according to the embodiment of the present disclosure.

FIG. 5 is a diagram illustrating an example of a specific method in which a valid page is managed in the storage device 100 according to the embodiment of the present disclosure.

In an example as shown in FIG. 5, a page a and a page b are stored in a first storage block 310 among the plurality of storage blocks 300 included in the memory 110. In the example, the page a and the page b correspond to valid pages included in the first storage block 310 and data is written to the page a and the page b according to a write command from the host device 200.

The controller 120 may manage the valid mapping table 400 which indicates regions where the page a and the page b written to the first storage block 310 are stored. For example, the valid mapping table 400 may include valid map information 401 and a valid segment 402.

The valid map information 401 may indicate the location of the valid segment 402. The valid map information 401 may also be referred to as an L1 mapping table. For example, the valid map information 401 may have a size smaller than the size of the valid segment 402.

The valid segment 402 may include valid address data. The valid address data may indicate the physical address of a region where a valid page is written in the memory 110. The valid address data may include mapping information between a logical address indicated by the host device 200 and a physical address of a valid page in the memory.

For example, as in the example illustrated in FIG. 5, the valid address data included in the valid segment 402 may indicate the physical address of a region where the page a is stored and the physical address of a region where the page b is stored.

In response to a write command from the host device 200, the controller 120 may set the information of the valid mapping table 400 and may write data to the regions of the first storage block 310 corresponding to the valid address data. When receiving a read command from the host device 200, the controller 120 may read data written to a physical address corresponding to a logical address according to the read command using the information included in the valid mapping table 400, and may provide the read data to the host device 200.

The description of the valid mapping table 400 for indicating and managing the region of data written to a storage block 300 is provided an example, and other implementations are possible. For example, data stored in a storage block 300 may be managed by various implementations of the valid mapping table 400.

In some implementations, a page where data is stored in a storage block 300 may be a valid page or may be a snapshot page which is generated according to a snapshot operation. In some implementations, a page where data is stored in a storage block 300 may operate as a valid page and a snapshot page at the same time.

When a snapshot operation is performed, the controller 120 may generate and manage snapshot data based on a valid page. The snapshot data may include a snapshot mapping table corresponding to the valid mapping table 400 for management of a valid page.

Figure 6:
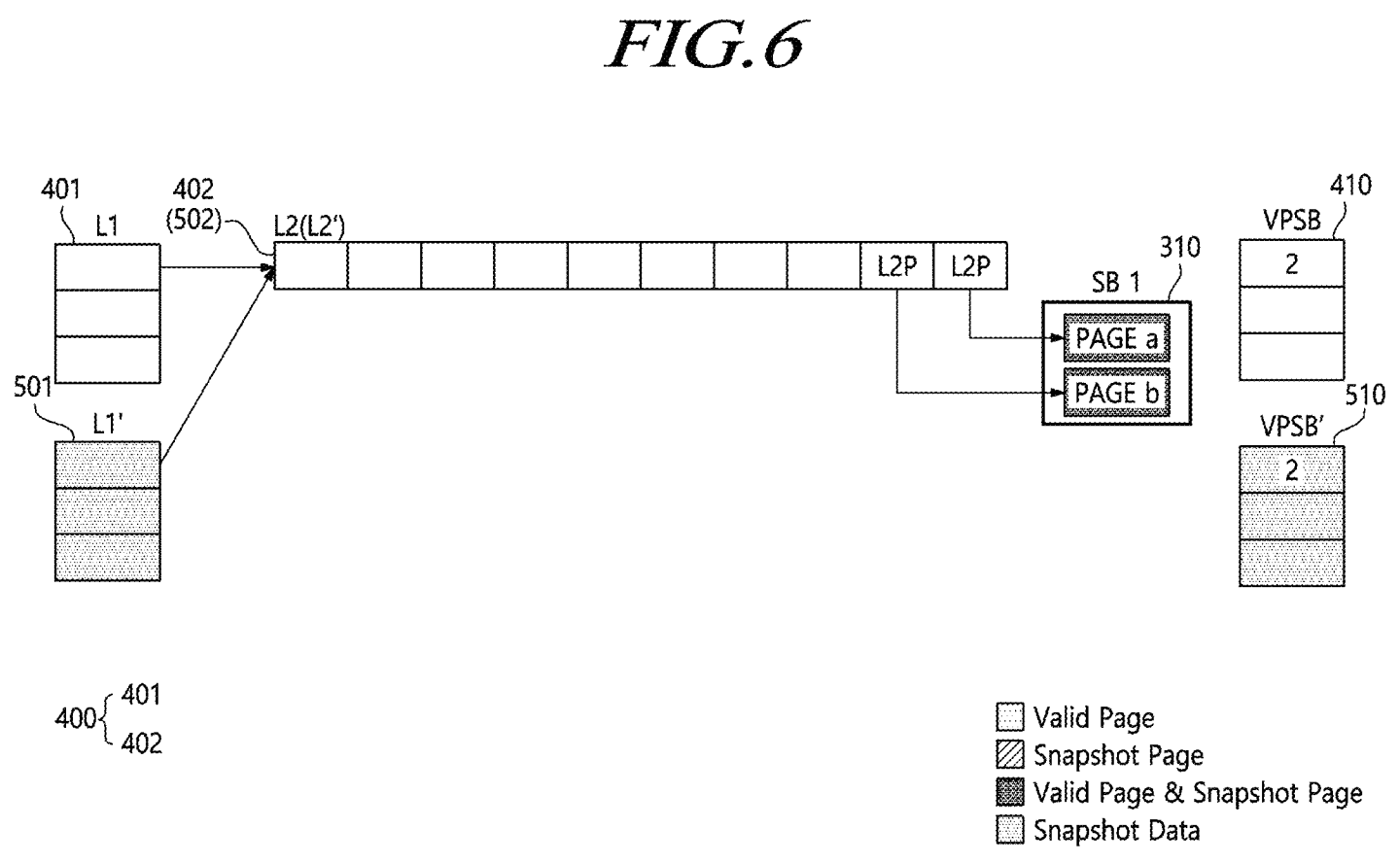

FIG. 6 is a diagram illustrating an example of a method in which a valid page and a snapshot page are managed in the storage device 100 according to the embodiment of the present disclosure.

In the example as shown in FIG. 6, a snapshot operation is performed by the snapshot controller 121 of the controller 120. The controller 120 may generate snapshot data according to the snapshot operation.

For example, the controller 120 may generate a snapshot page corresponding to a valid page. In the example, in order for the efficient use of the storage space of the memory 110, the controller 120 may manage snapshot data without copying the valid page during the snapshot operation.

For example, according to the snapshot operation, the controller 120 may generate snapshot map information 501 corresponding to the valid map information 401. The snapshot map information 501 may include the same information as the valid map information 401. The snapshot map information 501 may be referred to as an L1' mapping table.

According to the snapshot operation, the controller 120 may generate a snapshot count table 510 corresponding to the valid count table 410.

For example, when two valid pages including "PAGE a" and "PAGE b" are stored in the first storage block 310, the number of valid pages for the first storage block 310 becomes 2. In the same manner as the valid count table 410, the snapshot count table 510 may be generated to include information indicating that the number of snapshot pages for the first storage block 310 is 2.

The controller 120 may complete the snapshot operation by generating the snapshot map information 501 corresponding to the valid map information 401 and the snapshot count table 510 corresponding to the valid count table 410. The amount of data generated according to the snapshot operation may not be large.

The snapshot map information 501 generated by the controller 120 may indicate the location of a snapshot segment 502. The snapshot segment 502 may include snapshot address data as mapping information on the physical address of a region where a snapshot page is stored.

As the controller 120 performs the snapshot operation, the "PAGE a" and the "PAGE b," to which data is written in the first storage block 310, may be managed as not also the valid pages but also the snapshot pages. In this implementation, the "PAGE a" and the "Page b" may be considered as the valid pages and the snapshot pages at the same time.

Immediately after or after the snapshot operation is performed, when assuming that the number of pages to which data is written in the storage block 300 is N, the sum of the number of valid pages managed by the valid count table 410 and the number of snapshot pages managed by the snapshot count table 510 becomes 2N.

Since the numbers of pages to which data is written are managed by the valid count table 410 and the snapshot count table 510, respectively, the sum of the number of valid pages managed by the valid count table 410 and the number of snapshot pages managed by the snapshot count table 510 may be equal to or greater than the number of pages to which data is written in the storage block 300.

Immediately after or after the snapshot operation is performed, the snapshot segment 502 may be the same as the valid segment 402. The valid segment 402 may be indicated by the snapshot map information 501. The snapshot map information 501 may indicate the valid segment 402, and the valid segment 402 may be in a state in which it is indicated by the valid map information 401 and the snapshot map information 501.

Even when the valid mapping table 400 includes the valid map information 401 and the valid segment 402, since only the snapshot map information 501 corresponding to the valid map information 401 and the snapshot count table 510 corresponding to the valid count table 410 are generated in the snapshot operation, the amount of data generated according to the snapshot operation may be reduced.

After performing the snapshot operation, the controller 120 may manage snapshot data along with valid data when controlling the operation of the memory 110 according to at least one of an external command from the host device 200 or an internal command by the controller 120.

Figure 7:
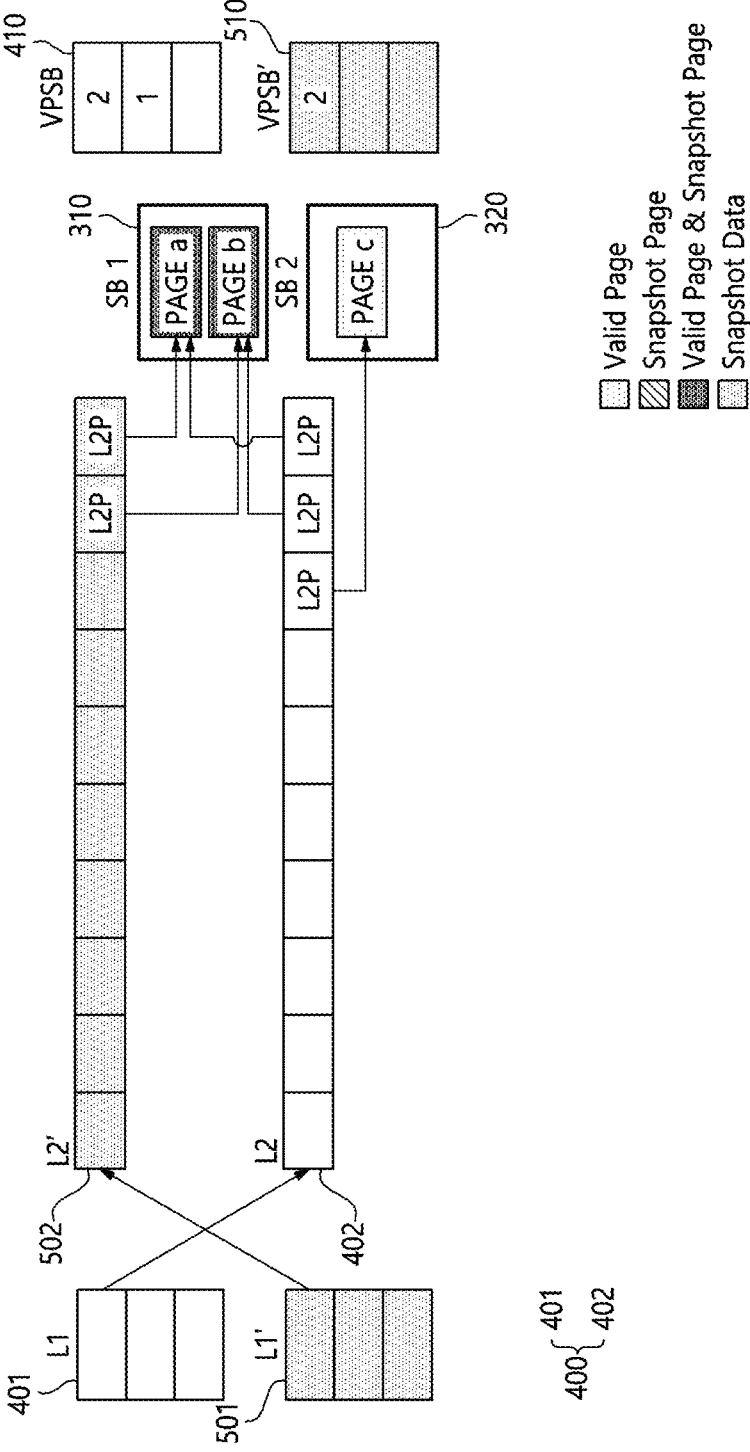
FIGS. 7 to 9 are diagrams illustrating an example of a specific method in which an operation according to a command is performed in a state in which a valid page and a snapshot page are stored in the storage device according to the embodiment of the present disclosure.
Figure 8:
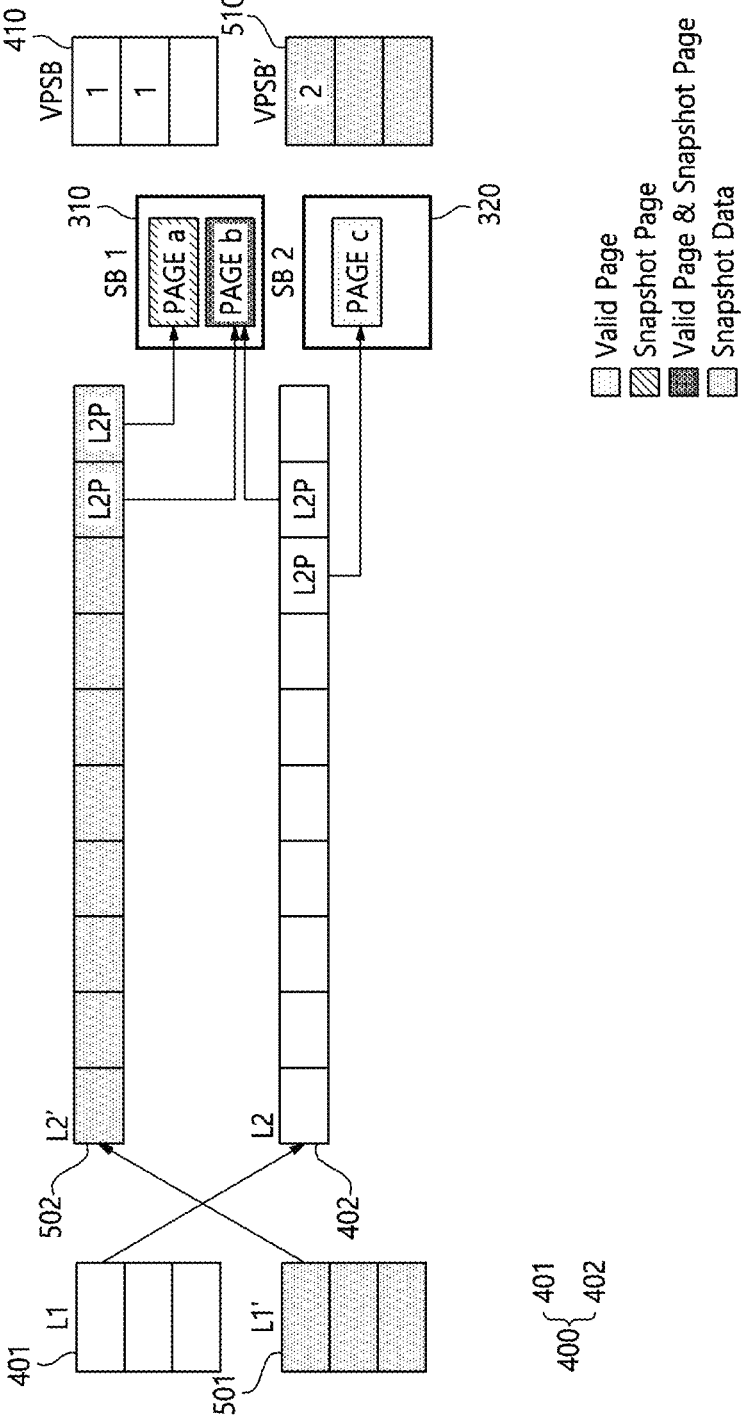
Figure 9:
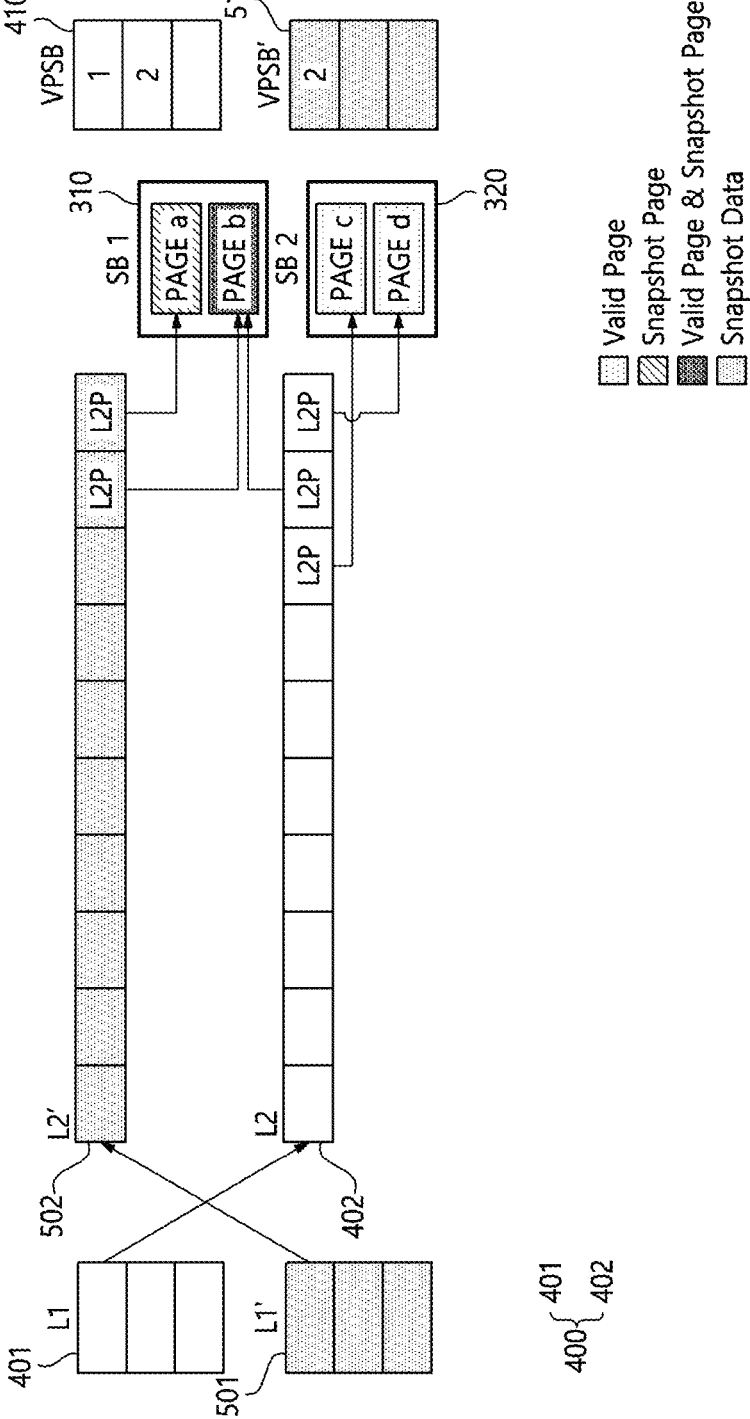

FIGS. 7 to 9 are diagrams illustrating an example of a specific method in which an operation according to a command is performed in a state in which a valid page and a snapshot page are stored in the storage device 100 according to the embodiment of the present disclosure.

Referring to FIG. 7, a case where, after the snapshot operation according to the example illustrated in FIG. 6 is performed, data is written to a storage block 300 of the memory 110 according to a write command received from the host device 200 is illustrated as an example.

For example, after performing the snapshot operation, the controller 120 may receive, from the host device 200, a write command which instructs to write new data.

According to the snapshot operation, the controller 120 may manage the snapshot map information 501 corresponding to the valid map information 401 and the snapshot count table 510 corresponding to the valid count table 410. Since the valid map information 401 and the snapshot map information 501 indicate the same valid segment 402, the valid segment 402 and the snapshot segment 502 may exist as one data.

According to the write command from the host device 200, the controller 120 may perform an operation for writing data to a new region of a storage block 300.

For example, the controller 120 may write a page c to a second storage block 320. The page c may be a valid page.

The controller 120 may store, in the valid segment 402, mapping information between the physical address of a region where the page c is written in the second storage block 320 and a logical address according to the write command from the host device 200. The valid segment 402 may be updated.

The controller 120 may change the valid map information 401 to indicate the updated valid segment 402.

As the valid segment 402 is updated, the controller 120 may separately manage the snapshot segment 502. Upon an occurrence of the update of the valid segment 402, the valid segment 402, which is before the update, is managed as the snapshot segment 502 and the updated valid segment 402 is newly generated as the new valid page.

As the new valid page is added to the second storage block 320, the valid count table 410 may be updated. By the valid count table 410, it may be managed that the number of valid pages stored in the first storage block 310 is 2 and the number of valid pages stored in the second storage block 320 is 1.

The valid count table 410 may be updated, and the snapshot count table 510 may be maintained. The snapshot count table 510 may include information indicating a state in which data is written to the memory 110 in the snapshot operation. Since the snapshot count table 510 is maintained without changes, the snapshot count table 510 may maintain information indicating that the number of snapshot pages stored in the first storage block 310 is 2.

When the valid page is added according to the write command from the host device 200, the snapshot map information 501 and the snapshot count table 510 of the snapshot data may maintain the states as they are regardless of the added valid page. According to the update of the valid segment 402, data may increase by only the amount of data corresponding to the updated valid segment 402 without any changes to the snapshot data.

An operation of writing new data and an operation of managing snapshot data according to a snapshot operation may be performed while minimizing the use of the storage space of the memory 110.

According to a command from the host device 200, the controller 120 may perform an operation of deleting or updating data stored in the memory 110.

For example, referring to FIG. 8, the controller 120 may receive, from the host device 200, a command to delete the "PAGE a" stored in the first storage block 310 or delete the mapping relationship for the "PAGE a." In some other implementations, the controller 120 may receive, from the host device 200, a command to update the "PAGE a" stored in the first storage block 310.

According to the command to delete the "PAGE a" stored in the first storage block 310 or delete the mapping relationship for the "PAGE a," which is received from the host device 200, the controller 120 may delete data indicating the physical address of the region where the "PAGE a" is stored among the valid address data included in the valid segment 402. In some other implementations, the controller 120 may delete the mapping relationship between the valid address data of the valid segment 402 and the "PAGE a" of the first storage block 310.

Since the "PAGE a" stored in the first storage block 310 is not a page which is indicated by the valid segment 402, the "PAGE a" may not be a valid page any longer. The controller 120 may update the valid count table 410. The updated valid count table 410 may indicate information representing a state in which one valid page is stored in the first storage block 310 and one valid page is written to the second storage block 320.

In some implementations, the "PAGE a" may not be a valid page but may be a snapshot page. The "PAGE a" may be a page which is managed for a recovery operation based on the snapshot operation. In this patent document, if there is a page in the memory, to which data is written, while the page being neither a valid page nor a snapshot page, such page may be referred to as an invalid page.

The controller 120 may manage data stored in the memory 110 while updating the valid segment 402 and the valid count table 410 according to the command from the host device 200.

Since the snapshot data according to the snapshot map information 501, the snapshot segment 502 and the snapshot count table 510 is maintained, the information on the "PAGE a" and the "PAGE b" corresponding to the snapshot pages when performing the snapshot operation may be managed.

Similarly, even in a case where an existing valid page is updated, the snapshot data may be managed while an operation of updating the valid page is performed.

For example, referring to FIG. 9, the controller 120 may receive, from the host device 200, a command which instructs to update the "PAGE a" stored in the first storage block 310.

According to the command from the host device 200, the controller 120 may proceed to make the "PAGE a" stored in the first storage block 310 be not a valid page any longer, and may write a page d to another region. For example, the controller 120 may write the page d to the second storage block 320.

Information indicating the physical address of a region where the page d of the second storage block 320 as a valid page is stored may be added to the valid segment 402. The number of valid pages in the first storage block 310 may decrease by 1, and the number of valid pages in the second storage block 320 may increase by 1. The controller 120 may update information in the valid count table 410.

After the existing "PAGE a" is updated according to the command from the host device 200, the "PAGE a" stored in the first storage block 310 may be managed as a snapshot page. The "PAGE b" stored in the first storage block 310 may be managed as a valid page and a snapshot page at the same time.

The "PAGE c" and the "PAGE d" stored in the second storage block 320 may be managed as valid pages.

Since the controller 120 manages a valid page using the valid mapping table 400 and the valid count table 410 and manages snapshot data using the snapshot mapping table and the snapshot count table 510 corresponding to the valid mapping table 400 and the valid count table 410, respectively, snapshot data may be managed while minimizing an increase in the number of snapshot pages.

By managing a valid page and a snapshot page according to a command from the host device 200 after performing a snapshot operation, the controller 120 may easily perform a recovery operation based on the snapshot operation when an abnormality occurs in the storage device 100.

In a state in which snapshot data is generated, the controller 120 may perform a background operation to improve the operation efficiency of the storage device 100. In this case, a snapshot page included in the snapshot data may also be a target for the background operation.

Figure 10:
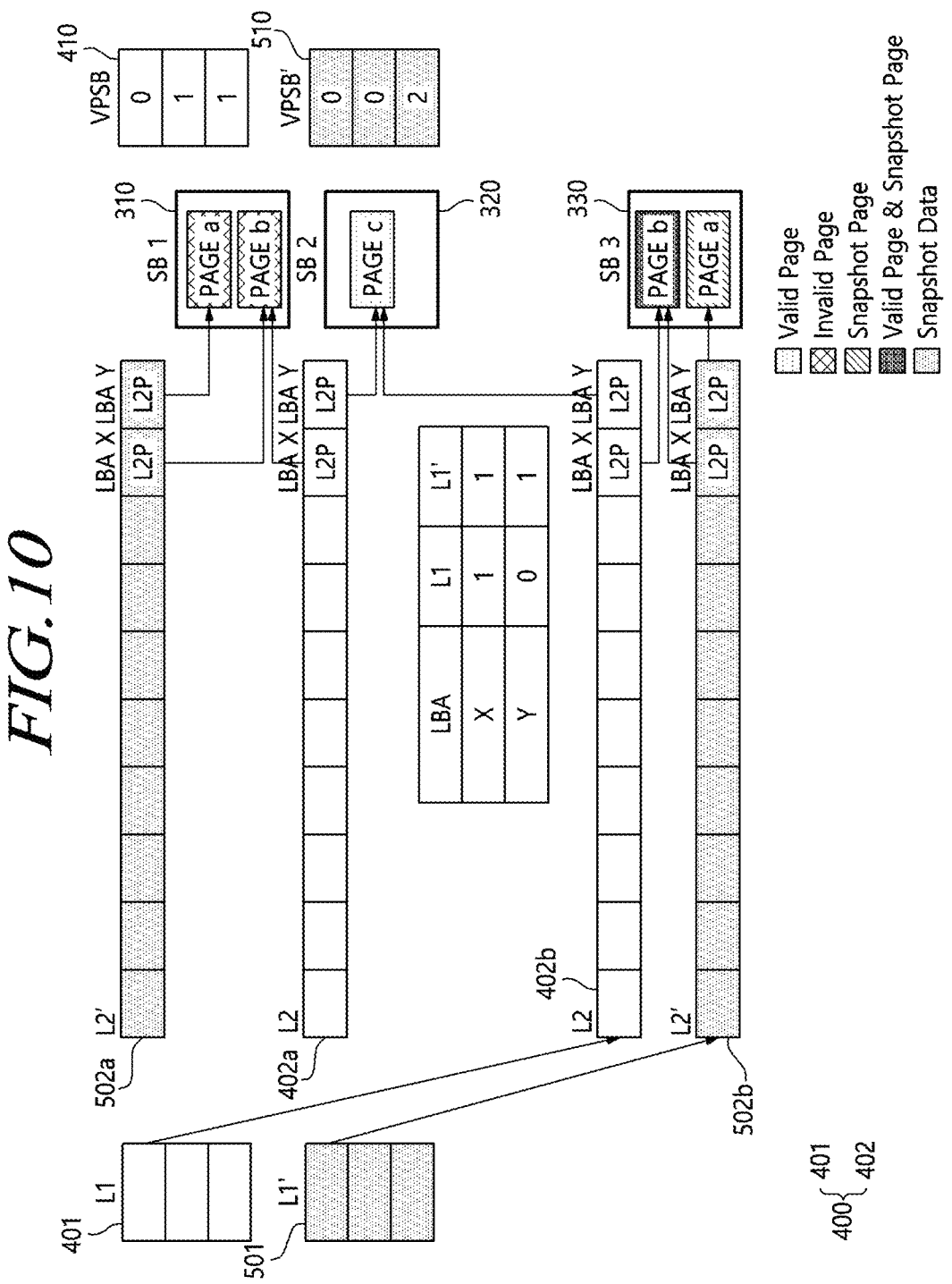
FIG. 10 is a diagram illustrating an example of a specific method in which a garbage collection operation is performed in a state in which a valid page and a snapshot page are stored in the storage device according to the embodiment of the present disclosure.

FIG. 10 is a diagram illustrating an example of a specific method in which a garbage collection operation is performed in a state in which a valid page and a snapshot page are stored in the storage device 100 according to the embodiment of the present disclosure.

In the example as shown in FIG. 10, a garbage collection operation is performed in a state in which a first valid segment 402a is indicated by valid map information 401 and a first snapshot segment 502a is indicated by snapshot map information 501 is illustrated as an example.

Before the garbage collection operation is performed, the example shows a state in which a "PAGE a" and a "PAGE b" are written to a first storage block 310, and a "PAGE c" is written to a second storage block 320.

In the example as shown in FIG. 10, the "PAGE a" and the "PAGE b" are indicated by logical addresses Y and X, respectively, included in the first snapshot segment 502a. The "PAGE a" and the "PAGE b" may correspond to snapshot pages.

In addition, the "PAGE b" is indicated by a logical address X included in the first valid segment 402a. Thus, the "PAGE b" may correspond to both a snapshot page and a valid page.

In the example as shown in FIG. 10, the "PAGE c" is indicated by a logical address Y included in the first valid segment 402a. The page c may correspond to a valid page.

When the "PAGE a," the "PAGE b" and the "PAGE c" are written to the first storage block 310 and the second storage block 320 as described above, the controller 120 may select a victim storage block and a target storage block for the garbage collection operation.

For example, when the number of free storage blocks 300 is insufficient or it is expected that the number of free storage blocks 300 is to be insufficient, the controller 120 may copy a valid page from a victim storage block to a target storage block.

When selecting a victim storage block, the controller 120 may select the victim storage block on the basis of the number of pages which needs to be moved from the victim storage block. The controller 120 may select a victim storage block on the basis of a larger value of the numbers of valid pages and snapshot pages stored in each storage block 300.

For example, the controller 120 may select, as a victim storage block, a storage block 300 with a smallest value among larger values of the numbers of valid pages and snapshot pages stored in storage blocks 300. Since a victim storage block is selected by considering even the numbers of snapshot pages, it is possible to prevent the efficiency of the garbage collection operation from deteriorating due to movement of snapshot pages.

For example, the garbage collection operation is performed in a case where the first storage block 310 is selected as a victim storage block and a third storage block 330 is selected as a target storage block.

The "PAGE a" stored in the first storage block 310 may be copied to the third storage block 330. Since the "PAGE a" corresponds to only a snapshot page, the snapshot address data of the logical address Y indicating the "PAGE a" in the first snapshot segment 502a may be updated to indicate the physical address of a region where the "PAGE a" is stored in the third storage block 330. As the first snapshot segment 502a is updated, a second snapshot segment 502b may be generated.

The "PAGE b" stored in the first storage block 310 may be copied to the third storage block 330. Since the "PAGE b" operates as a valid page and a snapshot page at the same time, the first valid segment 402a and the first snapshot segment 502a may be updated.

The logical address X indicating the page b of the first storage block 310 in the first valid segment 402a may be updated to indicate the page b copied to the third storage block 330. As the first valid segment 402a is updated, a second valid segment 402b may be generated.

The logical address X indicating the page b of the first storage block 310 in the first snapshot segment 502a may be updated to indicate the page b copied to the third storage block 330.

The page c of the second storage block 320 may remain as a valid page without being moved. The second valid segment 402b may indicate the physical address of the page c stored in the second storage block 320.

By the garbage collection operation, the "PAGE a" and the "PAGE b" stored in the first storage block 310 may be neither valid pages nor snapshot pages. The "PAGE a" and the "PAGE b" stored in the first storage block 310 may be invalid pages.

The "PAGE c" stored in the second storage block 320 may be a valid page.

The "PAGE b" stored in the third storage block 330 may be a valid page and at the same time a snapshot page. The "PAGE a" stored in the third storage block 330 may be not a valid page but a snapshot page.

According to the garbage collection operation, the valid count table 410 may represent information indicating that one valid page exists in each of the second storage block 320 and the third storage block 330. The snapshot count table 510 may represent information indicating that two snapshot pages exist in only the third storage block 330.

Even after snapshot data is generated, a garbage collection operation for efficient use of the storage blocks 300 of the memory 110 may be performed. In addition, in order to reduce the amount of data or the number of times data is copied during the garbage collection operation, data copying may be performed on the basis of whether data to be copied is a valid page or a snapshot page or corresponds to both a valid page and a snapshot page.

For example, since the page b to be copied among the pages stored in the first storage block 310 is indicated by the logical address X of the first valid segment 402a and the logical address X of the first snapshot segment 502a, the first valid segment 402a and the first snapshot segment 502a may be updated as the page b is copied to the third storage block 330 only once. On the basis of whether a page stored in a storage block 300 corresponds to a valid page and/or a snapshot page before copying data according to garbage collection, a garbage collection operation may be performed while reducing the number of times data is copied.

In addition, depending on the type of a storage block 300, the controller 120 may use only a part of valid data or snapshot data in a garbage collection operation. For example, in order to improve the performance of a garbage collection operation, the controller 120 may check whether all of pages stored in a storage block 300 are data newly stored after a snapshot operation. If all of pages stored in a storage block 300 are data newly stored after a snapshot operation, snapshot data for the corresponding pages may not exist. The controller 120 may perform a garbage collection operation without checking the snapshot count table 510 and by checking only the valid count table 410. The controller 120 may efficiently perform a garbage collection operation depending on the type of a storage block 300 while managing snapshot data.

The above-described example illustrates a garbage collection operation, but the embodiment of the present disclosure may also be applied to other background operations. For example, when a read reclaim operation is performed, a valid page and a snapshot page included in a storage block selected as a data copying target may be copied to another storage block. Even in this case, data copying may be performed on the basis of whether a corresponding page corresponds to only a valid page, only a snapshot page or both a valid page and a snapshot page.

Although various embodiments of the present disclosure have been described with particular specifics and varying details for illustrative purposes, various modifications, additions and substitutions in the disclosed embodiments and other embodiments may be made based on what is disclosed or illustrated in the present disclosure.

What is claimed is:

1. A storage device comprising:
   a memory including a plurality of storage blocks, each of the plurality of storage blocks including pages configured to store data, wherein the pages included in each of the plurality of storage blocks include a valid page to which valid data is written and a snapshot page that stores data corresponding to or associated with data in the valid page; and
   a controller in communication with the memory to access information in the memory on the valid page and the snapshot page and configured to i) generate a valid segment including valid address data indicating an address of the valid page and valid map information indicating a storage location of the valid segment, ii) manage the valid page based on the valid segment and the valid map information, iii) generate a snapshot segment including snapshot address data indicating an address of the snapshot page and snapshot map information indicating a storage location of the snapshot segment, and iv) manage the snapshot page based on the snapshot segment and the snapshot map information.

2. The storage device according to claim 1, wherein the controller is further configured to perform a snapshot operation that generates snapshot data for a recovery of the valid data, and generate the snapshot map information by copying the valid map information.

3. The storage device according to claim 2, wherein the controller is further configured to generate the snapshot segment to be same as the valid segment including the valid address data.

4. The storage device according to claim 2, wherein the controller is further configured to generate the snapshot map information to indicate the valid segment including the valid address data corresponding to the valid map information.

5. The storage device according to claim 4, wherein the controller is further configured to, in response to an update of the valid page, change the valid segment corresponding to the valid map information to an updated valid segment including updated valid address data indicating an address of an updated valid page, and maintain the snapshot map information to indicate the valid segment including the valid address data.

6. The storage device according to claim 2, wherein the controller is further configured to, in response to performing the snapshot operation, generate a snapshot count table indicating a number of snapshot pages stored in each of the plurality of storage blocks, by copying a valid count table indicating a number of valid pages stored in each of the plurality of storage blocks.

7. The storage device according to claim 6, wherein the controller is further configured to, in response to performing an update on the valid page, update the valid segment and the valid count table, and maintain the snapshot segment and the snapshot count table without making changes to the snapshot segment and the snapshot count table.

8. The storage device according to claim 6, wherein the controller is further configured to maintain or update the snapshot segment and the snapshot count table based on whether the update on the valid page is performed based on an external command received from an external device outside the storage device or an internal command received from the storage device.

9. The storage device according to claim 1, wherein the controller is further configured to a garbage collection operation on the plurality of storage blocks by selecting a victim storage block among the plurality of storage blocks based on a greater one of a number of valid pages and a number of snapshot pages that are stored in each of the plurality of storage blocks.

10. The storage device according to claim 9, wherein the controller is configured to copy a valid page and a snapshot page that is stored in the victim storage block to a target storage block among the plurality of storage blocks.

11. The storage device according to claim 9, wherein the controller sets the victim storage block as a free storage block upon satisfying a condition that a larger one of the number of valid pages and the number of snapshot pages stored in the victim storage block is 0.

12. The storage device according to claim 1, wherein the controller is further configured to manage at least one of snapshot pages to be same as at least one of valid pages.

13. The storage device according to claim 1, wherein
   the memory includes a storage block in which the number of pages included in the storage block is N (N is an integer where N≥1), wherein the N pages include valid pages and snapshot pages, and
   the controller is further configured to manage a sum of a number of valid pages and a number of snapshot pages to be equal to or greater than N.

14. The storage device according to claim 13, wherein the controller is further configured to manage a sum of the number of valid pages and the number of snapshot pages to be 2N.

15. A storage device comprising:
   a memory including a plurality of storage blocks configured to store data, wherein at least one of the plurality of storage blocks stores N (N is an integer where N≥1) pages and the N pages include a valid page to which valid data is written and a snapshot page including information corresponding to the valid data; and a controller in communication with the memory and configured to i) generate a valid segment including valid address data indicating an address of the valid page and valid map information indicating a storage location of the valid segment, ii) manage the valid page based on the valid segment and the valid map information, iii) generate a snapshot segment including snapshot address data indicating an address of the snapshot page and snapshot map information indicating a storage location of the snapshot segment, and iv) manage the snapshot page based on the snapshot segment and the snapshot map information, wherein at least one snapshot page is same as at least one valid page.

16. The storage device according to claim 15, wherein the controller is configured to manage a sum of a number of valid pages and a number of snapshot pages to be equal to or greater than N.

17. The storage device according to claim 15, wherein the controller is further configured to, in response to an update of a valid page stored in a first storage block after performing a snapshot operation of generating snapshot data for a recovery of the valid data, write an updated valid page to a second storage block and manage the valid page stored in the first storage block as the snapshot page.

18. A controller comprising:

a buffer memory; and a snapshot controller configured to i) load, into the buffer memory, a valid mapping table indicating a storage location of a valid page stored in an external memory and a valid count table indicating a number of valid pages, ii) generate, in response to performing a snapshot operation, a snapshot mapping table indicating a storage location of a snapshot page by copying the valid mapping table, and iii) generate a snapshot count table indicating a number of snapshot pages by copying the valid count table.

19. The controller according to claim 18, wherein the snapshot controller is further configured to, in response to an update of the valid page in the external memory, update the valid mapping table and the valid count table to correspond to the update of the valid page, and maintain the snapshot mapping table and the snapshot count table without making changes to the snapshot mapping table and the snapshot count table.

20. The controller according to claim 18, wherein when performing a background operation on the external memory, the snapshot controller is further configured to control the background operation based on the valid page stored in the external memory and the snapshot page indicated by the snapshot mapping table, and update the valid mapping table, the valid count table, the snapshot mapping table and the snapshot count table to correspond to an update of the valid page stored in the external memory according to the background operation.

* * * * *